(12) United States Patent
Nutter (10) Patent No.: US 10,148,720 B1
(45) Date of Patent: Dec. 4, 2018

(54) SYSTEMS AND METHODS FOR DATA SERIALIZATION AND TRANSFER

(71) Applicant: Dell Software Inc., Aliso Viejo, CA (US)

(72) Inventor: Stewart Nutter, Mt Horeb, WI (US)

(73) Assignee: Quest Software Inc., Aliso Viejo, CA (US)

(*) Notice: Subject to any disclaimer, the term of this patent is extended or adjusted under 35 U.S.C. 154(b) by 808 days.

(21) Appl. No.: 14/562,453

(22) Filed: Dec. 5, 2014

(51) Int. Cl.
*H04L 29/06* (2006.01)

(52) U.S. Cl.
CPC ................. *H04L 65/607* (2013.01)

(58) Field of Classification Search
CPC ...... H04L 65/607; H04L 61/106; H04L 51/36
USPC .......................................... 709/203
See application file for complete search history.

(56) References Cited

U.S. PATENT DOCUMENTS

| | | | | |
|---|---|---|---|---|
| 5,845,085 | A * | 12/1998 | Gulick | H04L 29/06 709/236 |
| 6,604,182 | B1 * | 8/2003 | Sexton | G06F 9/4435 707/999.202 |
| 6,906,646 | B1 * | 6/2005 | Mills | H04L 69/03 341/100 |
| 6,914,637 | B1 * | 7/2005 | Wolf | H04L 1/0057 348/473 |
| 7,263,597 | B2 * | 8/2007 | Everdell | H04L 47/125 709/201 |
| 7,441,185 | B2 | 10/2008 | Coulson et al. | |
| 8,332,539 | B2 | 12/2012 | Srinivasan et al. | |
| 2002/0165961 | A1 * | 11/2002 | Everdell | H04L 41/22 709/225 |
| 2010/0191806 | A1 * | 7/2010 | Kim | G06F 17/3002 709/203 |
| 2011/0246298 | A1 * | 10/2011 | Williams | G06Q 30/02 705/14.53 |
| 2012/0144405 | A1 | 6/2012 | Kalagananam et al. | |

OTHER PUBLICATIONS

Vasiliev, Alexey; "Binary Serialization Formats"; Leopard Blog; http://leopard.in.ua; Oct. 13, 2013; 10 pages.
Wikipedia; "Comparison of Data Serialization Formats"; http://en.wikipedia.org; Dec. 3, 2013; 17 pages.

* cited by examiner

*Primary Examiner* — Tonia L Dollinger
*Assistant Examiner* — Kristoffer L S Sayoc
(74) *Attorney, Agent, or Firm* — Winstead PC (57) ABSTRACT

In one embodiment, a method includes serializing a data set into a binary package. The serializing includes, for each element of the data set, determining whether the element includes a predefined multi-bit element value. The serializing further includes encoding a lead byte comprising a data-type identifier and a value indicator. Responsive to a determination that the element includes the predefined multi-bit element value, the encoding of the lead byte comprises setting the value indicator to a preconfigured indicator of the predefined multi-bit element value, the preconfigured indicator requiring fewer bits to represent than the predefined multi-bit element value. Responsive to a determination that the element does not include the predefined multi-bit element value, the encoding of the lead byte comprises setting the value indicator to a preconfigured value-follows indicator. The serializing additionally includes encoding an element-value bit stream when the value indicator is set to the preconfigured value-follows indicator.

20 Claims, 8 Drawing Sheets

SYSTEMS AND METHODS FOR DATA SERIALIZATION AND TRANSFER

BACKGROUND

Technical Field

The present disclosure relates generally to data communication and more particularly, but not by way of limitation, to systems and methods for data serialization and transfer.

History of Related Art

As more and more data is sent across the network, more bandwidth becomes necessary, which can be expensive. Performance can also be adversely affected. Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes, at a source, serializing a data set into a binary package. The serializing includes, for each element of the data set corresponding to a data type of a plurality of data types, determining whether the element includes a predefined multi-bit element value. The serializing further includes encoding a lead byte comprising a data-type identifier and a value indicator. Responsive to a determination that the element includes the predefined multi-bit element value, the encoding of the lead byte comprises setting the value indicator to a preconfigured indicator of the predefined multi-bit element value, the preconfigured indicator requiring fewer bits to represent than the predefined multi-bit element value. Responsive to a determination that the element does not include the predefined multi-bit element value, the encoding of the lead byte comprises setting the value indicator to a preconfigured value-follows indicator. The serializing additionally includes encoding an element-value bit stream when the value indicator is set to the preconfigured value-follows indicator. Moreover, the method includes initiating transmission of the binary package to a destination, wherein the destination is configured to read an encoded format of the binary package.

In one embodiment, an information handling system includes a processing unit, wherein the processing unit is operable to implement a method. The method includes, at a source, serializing a data set into a binary package. The serializing includes, for each element of the data set corresponding to a data type of a plurality of data types, determining whether the element includes a predefined multi-bit element value. The serializing further includes encoding a lead byte comprising a data-type identifier and a value indicator. Responsive to a determination that the element includes the predefined multi-bit element value, the encoding of the lead byte comprises setting the value indicator to a preconfigured indicator of the predefined multi-bit element value, the preconfigured indicator requiring fewer bits to represent than the predefined multi-bit element value. Responsive to a determination that the element does not include the predefined multi-bit element value, the encoding of the lead byte comprises setting the value indicator to a preconfigured value-follows indicator. The serializing additionally includes encoding an element-value bit stream when the value indicator is set to the preconfigured value-follows indicator. Moreover, the method includes initiating transmission of the binary package to a destination, wherein the destination is configured to read an encoded format of the binary package.

In one embodiment, a computer-program product includes a non-transitory computer-usable medium having computer-readable program code embodied therein. The computer-readable program code is adapted to be executed to implement a method. The method includes, at a source, serializing a data set into a binary package. The serializing includes, for each element of the data set corresponding to a data type of a plurality of data types, determining whether the element includes a predefined multi-bit element value. The serializing further includes encoding a lead byte comprising a data-type identifier and a value indicator. Responsive to a determination that the element includes the predefined multi-bit element value, the encoding of the lead byte comprises setting the value indicator to a preconfigured indicator of the predefined multi-bit element value, the preconfigured indicator requiring fewer bits to represent than the predefined multi-bit element value. Responsive to a determination that the element does not include the predefined multi-bit element value, the encoding of the lead byte comprises setting the value indicator to a preconfigured value-follows indicator. The serializing additionally includes encoding an element-value bit stream when the value indicator is set to the preconfigured value-follows indicator. Moreover, the method includes initiating transmission of the binary package to a destination, wherein the destination is configured to read an encoded format of the binary package.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Serialization can be used to translate, inter alia, data structures or object state into a format that can be stored (e.g., in a file or memory buffer) or transmitted across a network connection. The data structures or object state can typically be reconstructed later in the same or another computer environment. When the resulting stream of bits is reread according to the serialization format, a semantically identical clone of the original object typically can be created. Data-intensive software applications such as for example, applications that perform data backup, can monopolize significant computing resources such as, for example, processing power, storage and bandwidth, when performing serialization.

The present disclosure describes examples of data serialization that can greatly improve the efficiency with which data elements are represented during serialization. In an example, in certain embodiments, a serialization format can define a preconfigured indicator of one or more predefined multi-bit element values on a data-type-specific basis. In that way, in certain embodiments, a data element having a value that corresponds to a predefined multi-bit element value can be serialized by encoding the preconfigured indicator instead of the predefined multi-bit element value. In a typical embodiment, the preconfigured indicator requires fewer bits to represent than the predefined multi-bit element value. Advantageously, in certain embodiments, this and other features described herein can increase throughput, decrease computer resource requirements (e.g., storage and bandwidth), and/or achieve other technical benefits in connection with serialization of data sets.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
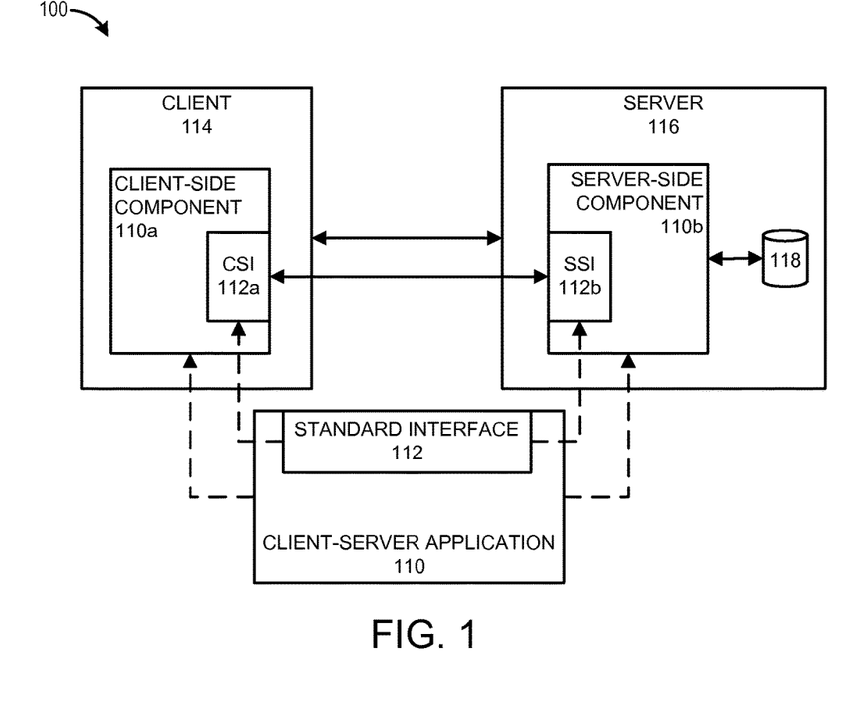
FIG. 1 illustrates an example of a system for serializing data and transmitting and/or storing the serialized data.

FIG. 1 illustrates an example of a system 100 for serializing data and transmitting and/or storing the serialized data. The system 100 includes a client 114 and a server 116 operable to communicate over a computer network such as a local area network, a wide area network, etc. As shown, the client 114 and the server 116 can collaborate to execute a client-server application 110. In certain embodiments, the client 114 and the server 116 are information handling systems. An example of the client 114 and the server 116 is described in greater detail with respect to FIG. 2.

In certain embodiments, the client-server application 110 provides a generic framework that facilitates efficient communication of data between a given client and server such as, for example, the client 114 and the server 116. The client-server application 110 can define a standard interface 112 that establishes a way for clients and servers to exchange data of various types and structures using a resource-sensitive serialization method. In a typical embodiment, the standard interface 112 abstracts details of the serialization method from respective clients and servers.

As shown, the client-server application 110 can be implemented as a client-side component 110a and a server-side component 110b that are executed on the client 114 and the server 116, respectively. In an embodiment, the client-side component 110a can instantiate a set of client-specific classes and/or other structures that are defined by the client-server application 110. Similarly, the server-side component 110b can instantiate a set of server-specific classes or other structures that are defined by the client-server application 110. In some cases, the client-specific classes or the server-specific classes may include methods that can be implemented, for example, by developer-written code which is tailored to specific functional requirements.

The client-side component 110a and the server-side component 110b can additionally include a client-side interface 112a and a server-side interface 112b, respectively, that each conform to the standard interface 112. For example, the client-side interface 112a and the server-side interface 112b can each implement the standard interface 112, or a respective client-specific or server-specific portion thereof. It should be appreciated that the client-side component 110a and the server-side component 110b may also include, for example, developer-written code to achieve specific objectives. In that way, the client-server application 110 can be used as a template to simplify creation of the client-side component 110a and the server-side component 110b.

More specifically, the client-side interface 112a can include a set of standard methods or functions and corresponding arguments that are defined for clients by the standard interface 112. In various cases, some of the methods or functions of the client-side interface 112a may be made accessible to be called by the server-side component 110b while others may be designed to be called within the client-side component 110a (e.g., by custom developer-written code). In an example, Table 1 below lists example functions or methods that can be included in the client-side interface 112a.

TABLE 1

EXAMPLE FUNCTIONS/METHODS FOR CLIENTS

| EXAMPLE FUNCTION OR METHOD | DESCRIPTION |
|---|---|
| Login | Initiate a connection session with the server |
| Logout | Disconnect a session from the server |
| Execute | Execute an action with the server and return results |

TABLE 1-continued

EXAMPLE FUNCTIONS/METHODS FOR CLIENTS

| EXAMPLE FUNCTION OR METHOD | DESCRIPTION |
| --- | --- |
| IsLicensed | Return true or false based on whether the application is licensed |
| GetErrorText | If a method or function returns an error code, this method/function can return the text for the code. |
| GetLicenseInfo | Get text from the server for the current license |
| Dispose | Clean up stored resources |

In like fashion, the server-side interface 112b can include a set of standard methods or functions and corresponding arguments that are defined for servers by the standard interface 112. In various cases, some of the methods or functions of the server-side interface 112b may be made accessible to be called by the client-side component 110a while others may be designed to be called within the server-side component 110b (e.g., by custom developer-written code). In an example, Table 2 below lists example functions or methods that can be included in the server-side interface 112b.

TABLE 2

EXAMPLE FUNCTIONS/METHODS FOR SERVERS

| EXAMPLE FUNCTION OR METHOD | DESCRIPTION |
| --- | --- |
| ValidateLogin | Returns true if the client is allowed |
| IsLicenseValid | Returns true if the license is still valid |
| GetLicenseDetails | Returns text that reflects the current state of the license |
| SetActions | Called to register action verbs the server will handle. For example, this can be a method that is passed an action-specific registration method (e.g., a delegate method) which registers an action verb (e.g., a string name) and an action-specific execution method (e.g., another delegate method) that will perform the action. In a typical embodiment, this method or function allows multiple calls to register action verbs. |
| IsConfigured | Returns true once the server is configured to handled client requests. |
| ListActions | Returns a list of registered actions by name to the client. |

The server-side component 110b can also manage and maintain configurations 118 for the client-server application 110. In certain embodiments, the configurations 118 can be representative of a single centralized location for settings related to the client-server application 110 and a single installation path when installing the server-side component 110b on the server 116. Advantageously, in certain embodiments, the configurations 118 can eliminate the need to maintain separate configuration files or settings, for example, for an HTTP server application, Internet-based services, and/or other services and applications.

Figure 2:
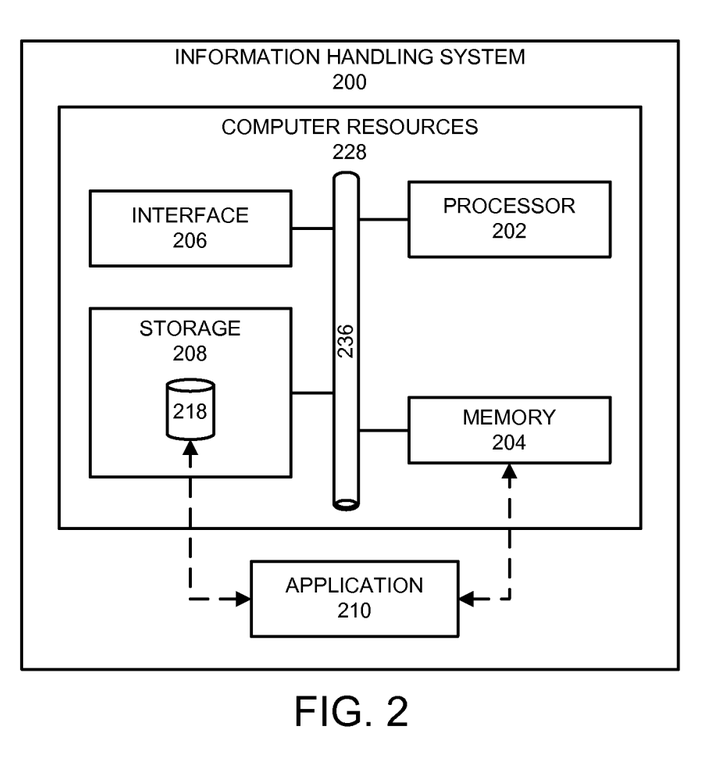
FIG. 2 illustrates an example of an information handling system.

FIG. 2 illustrates an example of an information handling system 200 that can be representative, for example, of the client 114 and/or the server 116 of FIG. 1. The information handling system 200 includes an application 210 operable to execute on computer resources 228. The application 210 can be similar, for example, to the client-side component 110a and/or the server-side component 110b of FIG. 1. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 202, memory 204, storage 208, interface 206, and bus 236. Although a particular information handling system is depicted having a particular number of particular components in a particular arrangement, this disclosure contemplates any suitable information handling system having any suitable number of any suitable components in any suitable arrangement.

Processor 202 may be a microprocessor, controller, or any other suitable computing device, resource, or combination of hardware, software and/or encoded logic operable to execute, either alone or in conjunction with other components, (e.g., memory 204), the application 210. Such functionality may include providing various features discussed herein. In particular embodiments, processor 202 may include hardware for executing instructions, such as those making up the application 210. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses. Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the information handling system 200, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the information handling system 200 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the information handling system 200, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate. In addition, in certain embodiments, the application 210 is operable to establish, or update, configurations in a data store 218 on the storage 208. The data store 218 can be a database, flat file, and/or the like. The configurations can be similar, for example, to the configurations 118 of FIG. 1.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 206 for any one or more of these networks, where appropriate.

In some embodiments, interface 206 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices. Interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the information handling system 200 to each other. As an example and not by way of limitation, bus 236 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

An example of a serialization approach that can be used in conjunction with the system 100 of FIG. 1, or separately therefrom, will now be described. In certain embodiments, each data type can be assigned a data-type identifier. Examples of data-type identifiers that can be assigned to various data types are shown in Table 3 below. It should be appreciated that, in various implementations, different data types, more data types, and/or fewer data types may be specified. For example, it should be appreciated that sixteen different data types can be represented when using a four-bit data-type identifier as shown in Table 3.

TABLE 3

EXAMPLE DATA-TYPE IDENTIFIERS

| | | Example Data-Type Identifiers | |
|---|---|---|---|
| | Description | BIN | HEX |
| ARRAY | Ordered data set | 0000 | 0x00 |
| HASHMAP | Key/value data set | 0001 | 0x01 |
| STRING | UTF-8 (Universal Character Set + Transformation Format – 8 bit) | 0010 | 0x02 |
| INTEGER | 64-bit signed integer | 0011 | 0x03 |
| BOOL | Boolean values | 0100 | 0x04 |
| DATETIME | Date | 0101 | 0x05 |
| GUID | Globally Unique Identifier | 0110 | 0x06 |
| DOUBLE | Floating point | 0111 | 0x07 |
| BINARY | Set of bytes | 1000 | 0x08 |
| NULL | Null | 1001 | 0x09 |

For some data types, value indicators can be established for purposes of providing a concise representation of certain predefined element values. In many cases, the predefined element values may be values that occur with a relatively high degree of frequency during data storage and transmission. In general, the value indicator associated with a given predefined element value may be considered a preconfigured indicator of that value. In many cases, the preconfigured indicator requires fewer bits to represent than the predefined value (e.g., a multi-bit value) with which it is associated. For data types that utilize value indicators, the value indicator can be set to a value-follows indicator when a given element's value is not specified in a correspond set of predefined element values. When the value-follows indicator is set, the given element's value can be specified in one or more subsequent bytes. Tables 4-7 below illustrate examples of value indicators for various example data types.

TABLE 4

EXAMPLE VALUE INDICATORS FOR BOOL DATA TYPE

| | Value Indicator | |
|---|---|---|
| Predefined Element Value | BIN | HEX |
| TRUE | 0001 | 0x01 |
| FALSE | 0000 | 0x00 |

TABLE 5

EXAMPLE VALUE INDICATORS FOR DATETIME DATA TYPE

| | | Value Indicator | |
|---|---|---|---|
| Predefined Element Value | Description | BIN | HEX |
| DATETIME.MIN | Smallest supported value for DATETIME | 0000 | 0x00 |
| DATETIME.MAX | Largest supported value for DATETIME | 0001 | 0x01 |
| VALUE FOLLOWS | Value will be specified in subsequent byte(s), e.g., the next 8 bytes, as an unsigned integer. | 0010 | 0x02 |

TABLE 6

EXAMPLE VALUE INDICATORS FOR GUID DATA TYPE

| Predefined Element Value | Description | Value Indicator BIN | HEX |
|---|---|---|---|
| GUID.EMPTY | Empty GUID (e.g., 16 bytes of zeroes) | 0000 | 0x00 |
| VALUE FOLLOWS | Value will be specified in subsequent byte(s), e.g., the next 16 bytes, as an unsigned integer. | 0001 | 0x01 |

TABLE 7

EXAMPLE VALUE INDICATORS FOR DOUBLE DATA TYPE

| Predefined Element Value | Description | Value Indicator BIN | HEX |
|---|---|---|---|
| DOUBLE.MIN | Minimum supported value for DOUBLE | 0000 | 0x00 |
| DOUBLE.MAX | Maximum supported value for DOUBLE | 0001 | 0x01 |
| DOUBLE.NAN | Not a number | 0010 | 0x02 |
| DOUBLE.NEGATIVEINFINITY | Negative infinity | 0011 | 0x03 |
| DOUBLE.POSITIVEINFINITY | Positive infinity | 0100 | 0x04 |
| VALUE FOLLOWS | Value will be specified in subsequent byte(s), e.g., the next 8 bytes, with mantissa and exponent represented as unsigned integers. | 0101 | 0x05 |

In certain embodiments, serializing a data element of any given data type can involve encoding a first byte, referred to herein as a lead byte and, potentially, one or more subsequent bytes. In general, a high-nibble portion of the lead byte includes a data-type identifier for the data element. The data-type identifier can be, for example, one of the data-type identifiers shown above in Table 3. In various cases, a low-nibble portion of the lead byte can be an element-size indicator. In general, the element-size indicator specifies a size, or length, of a variable-size element bit stream that represents the data element's value (e.g., a string with a length of three could have an element-size indicator of three, an array with five elements could have an element-size indicator of five, etc.). In some cases, the low-nibble portion can be value indicator as described above with respect to Tables 4-7. In still other cases, such as, for example, in the case of a variable-size signed integer, the low-nibble portion can indicate all or a portion of the element value. It should be appreciated that the contents of the low-nibble portion of the lead byte can vary according to data type. Examples of an encoding format for certain data types are shown below in Table 8.

TABLE 8

| | LEAD BYTE | | |
|---|---|---|---|
| | HIGH NIBBLE | LOW NIBBLE | SUBSEQUENT BYTE(S) |
| ARRAY | Data-type ID (see Table 3) | Element-size indicator (e.g., variable length unsigned integer that follows binary pattern of cvvv, where 'c' is a continuation bit and the 'v' bits are used to express the element size as an integer value). Additional bytes may be needed if the size is too large to represent in 3 bits (i.e., larger than decimal value 7). The continuation bit is set to '1' each time another byte will be sent, and is set to '0' otherwise. | Element-value bit stream according to the element-size indicator |
| HASHMAP | Data-type ID (see Table 3) | Element-size indicator (e.g., variable length unsigned integer that follows binary pattern of cvvv, where 'c' is a continuation bit and the 'v' bits are used to express the element size as an integer value). Additional bytes may be needed if the size is too large to represent in 3 bits (i.e., larger than decimal value 7). The continuation bit is set to '1' each time another byte will be sent, and is set to '0' otherwise. | Element-value bit stream according to the element-size indicator |
| STRING | Data-type ID (see Table 3) | Element-size indicator (e.g., variable length unsigned integer that follows binary pattern of cvvv, where 'c' is a continuation bit and the 'v' bits are used to express the element size as an integer value). Additional bytes may be needed if the size is too large to represent in 3 bits (i.e., larger than decimal value 7). The continuation bit is set to '1' | Element-value bit stream according to the element-size indicator |

TABLE 8-continued

| | LEAD BYTE | | |
|---|---|---|---|
| | HIGH NIBBLE | LOW NIBBLE | SUBSEQUENT BYTE(S) |
| INTEGER | Data-type ID (see Table 3) | each time another byte will be sent, and is set to '0' otherwise. Element-size indicator (e.g., variable length unsigned integer that follows binary pattern of cvvv, where 'c' is a continuation bit and the 'v' bits are used to express the element size as an integer value). Additional bytes may be needed if the size is too large to represent in 3 bits (i.e., larger than decimal value 7). The continuation bit is set to '1' each time another byte will be sent, and is set to '0' otherwise. | If the integer value is completely expressed in the lead byte, there are no subsequent bytes. Otherwise, if the integer value is not completely expressed in the lead byte, each subsequent byte follows a binary pattern of cvvvvvvv. The continuation bit is set to '1' each time another byte will be sent, and is set to '0' otherwise. |
| BOOL | Data-type ID (see Table 3) | Value indicator (see Table 4) | No subsequent bytes are generally required. |
| DATETIME | Data-type ID (see Table 3) | Value indicator (see Table 5) | If the value indicator is set to something other than the value-follows indicator, there are no subsequent bytes. If the value indicator is set to the value-follows indicator, an element-value bit stream of a certain size (e.g., 8 bytes) can be used to express the DATETIME value. |
| GUID | Data-type ID (see Table 3) | Value indicator (see Table 6) | If the value indicator is set to something other than the value-follows indicator, there are no subsequent bytes. If the value indicator is set to the value-follows indicator, an element-value bit stream of a certain size (e.g., 8 bytes) can be used to express the GUID value. |
| DOUBLE | Data-type ID (see Table 3) | Value indicator (see Table 7) | If the value indicator is set to something other than the value-follows indicator, there are no subsequent bytes. If the value indicator is set to the value-follows indicator, an element-value bit stream of a certain size (e.g., 8 bytes) can be used to express the DOUBLE value. |
| BINARY | Data-type ID (see Table 3) | Element-size indicator (e.g., variable length unsigned integer that follows binary pattern of cvvv, where 'c' is a continuation bit and the 'v' bits are used to express the element size as an integer value). Additional bytes may be needed if the size is too large to represent in 3 bits (i.e., larger than decimal value 7). The continuation bit is set to '1' each time another byte will be sent, and is set to '0' otherwise. | Element-value bit stream according to the element-size indicator |
| NULL | Data-type ID (see Table 3) | 0000 | No subsequent bytes are generally required. |

Figure 3:
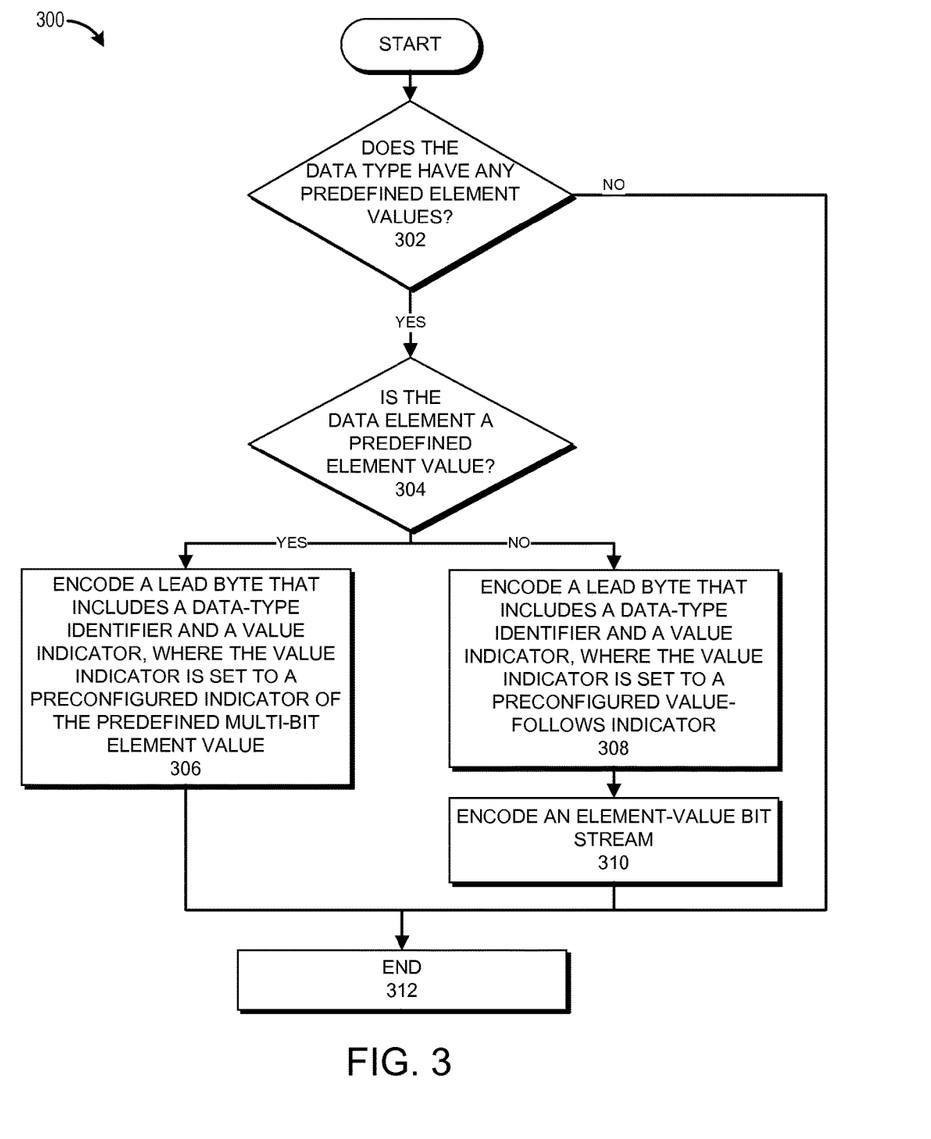
FIG. 3 illustrates an example of a process for serializing a data element into a binary package.

FIG. 3 illustrates an example of a process 300 for serializing a data element into a binary package. In certain embodiments, the process 300 can be performed repeatedly for each element of a data set. The process 300 can be implemented by any system that can process data. For example, the process 300, in whole or in part, can be implemented by one or more of the client 114, the server 116, and the information handling system 200. The process 300 can also be performed generally by the system 100. Although any number of systems, in whole or in part, can implement the process 300, to simplify discussion, the process 300 will be described in relation to a source information handling system.

At decision block 302, the source information handling system determines whether a data type of the data element has any predefined element values. For example, as described above with respect to Tables 4-7, certain data types can be have predefined element values that are associated with value indicators. If not, the process 300 proceeds to block 312 and ends. Otherwise, if the data type is determined to have one or more predefined element values, the process 300 proceeds to decision block 304.

At decision block 304, the source computer system determines whether the data element's value corresponds to one of the one or more predefined element values. If so, at block 306, the source computer system encodes a lead byte that includes a data-type identifier and a value indicator which is set to a preconfigured indicator of the data element's value. The data-type identifier can be, for example, one of the data-type identifiers shown above in Table 3. The value indicator can be set, for example, to one of the preconfigured indicators shown in Tables 4-7 above. In general, the lead byte can follow an encoding format illustrated in Table 8 above. At block 312, the process 300 ends.

If it is determined at decision block 304 that the data element's value does not correspond to one of the one or more predefined element values, the process 300 proceeds to block 308. At block 308, the source computer system encodes a lead byte that includes a data-type identifier and a value indicator which is set to a preconfigured value-follows indicator. As described above, the data-type identifier can be, for example, one of the data-type identifiers shown in Table 3. The value indicator can be set, for example, to one of the preconfigured value-follows indicators shown in Tables 5-7 above (depending, e.g., on data type). At block 310, the source computer system encodes an element-value bit stream that represents the data element's value. For example, if the data element is of a GUID data type, the data element's value may be expressed in a 16-byte element-value bit stream. At block 312, the process 300 ends.

Figure 4:
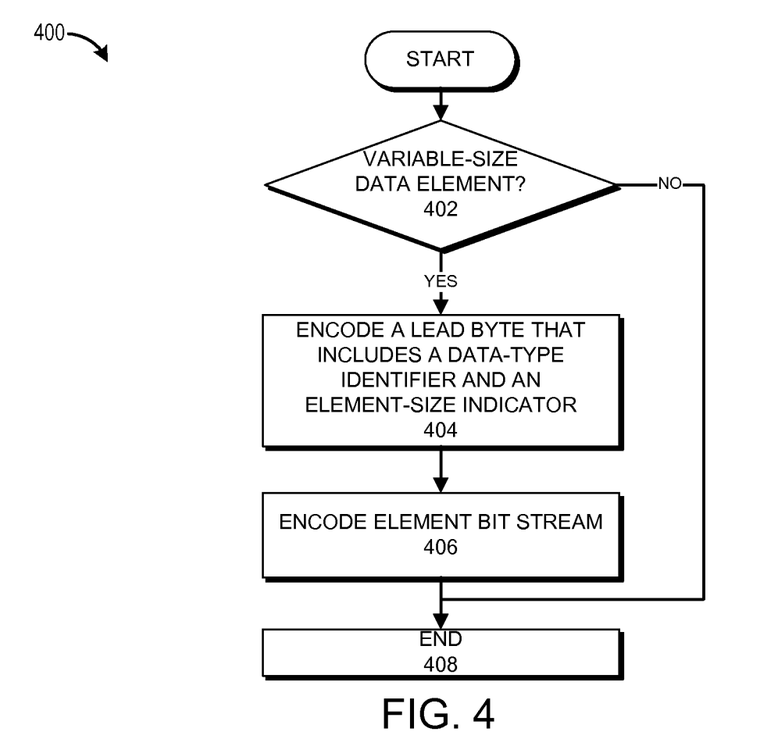
FIG. 4 illustrates an example of a process for serializing a data element into a binary package.

FIG. 4 illustrates an example of a process 400 for serializing a data element into a binary package. In certain embodiments, the process 400 can be performed repeatedly for each element of a data set. The process 400 can be implemented by any system that can process data. For example, the process 400, in whole or in part, can be implemented by one or more of the client 144, the server 116, and the information handling system 200. The process 400 can also be performed generally by the system 100. Although any number of systems, in whole or in part, can implement the process 400, to simplify discussion, the process 400 will be described in relation to a source information handling system.

At decision block 402, the source computer system determines whether the data element is a variable-size data element. If not, the process 400 proceeds to block 408 and ends. Otherwise, if it is determined at the decision block 402 that the data element is a variable-size data element, the process 400 proceeds to block 404. At block 404, the source computer system encodes a lead byte that includes a data-type identifier and an element-size indicator. The data-type identifier can be, for example, one of the data-type identifiers shown in Table 3 above. The element-size indicator can be, for example, any of the element-size indicators shown in Table 8 above (dependent, e.g., on data type). At block 406, the source computer system encodes an element bit stream in conformance to the element-size indicator. At block 408 the process 400 ends.

It should be appreciated that, in various embodiments, aspects of the process 300 of FIG. 3 and the process 400 of FIG. 4 can be combined to serialize a given data set into a binary package. For example, depending on data type, some data elements in the data set may be serialized according to the process 300 while other data elements are serialized according to the process 400. In addition, depending on data type, still other data elements may be serialized using a different process (e.g., data elements of the INTEGER data type shown in Table 8 above). The binary package may be considered to include all encoded bytes, regardless of the specific way each data element serialized.

Figure 5:
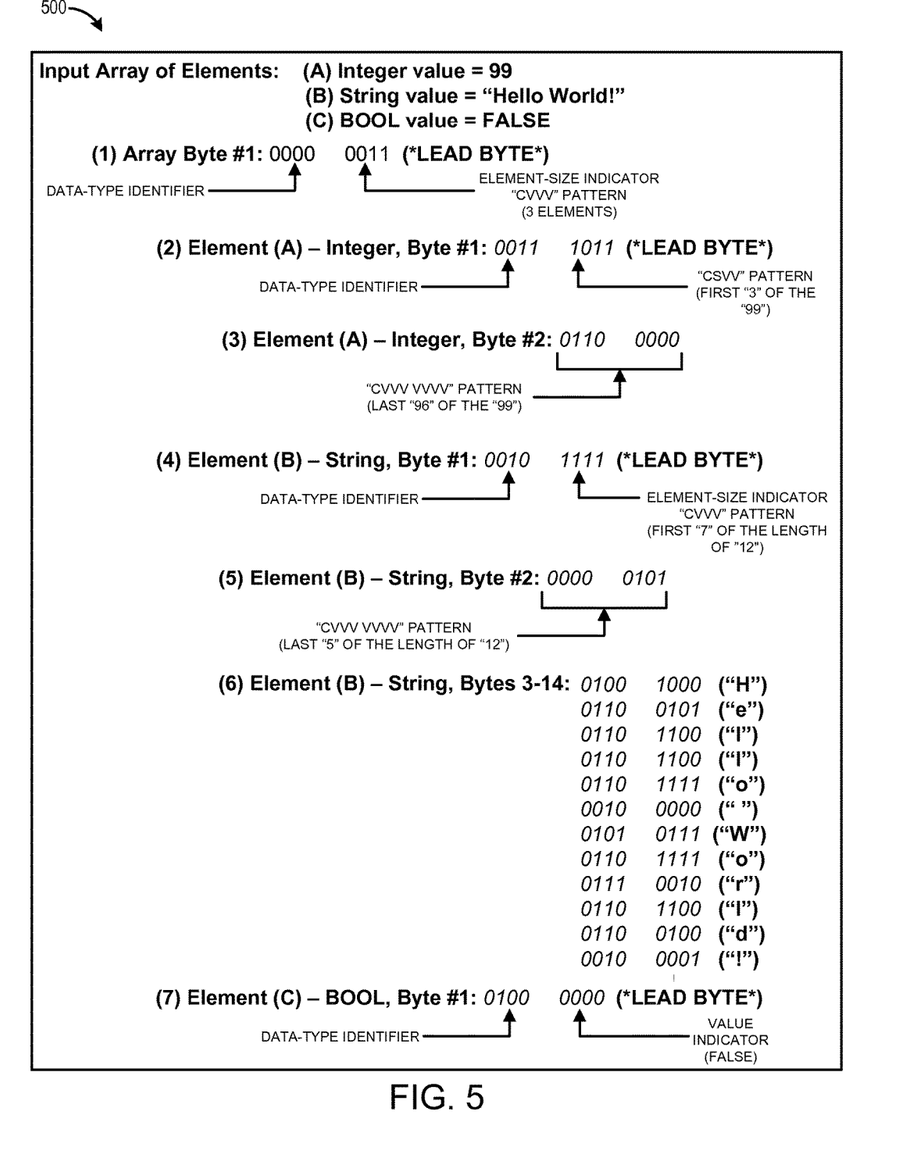
FIG. 5 illustrates an example serialization.

FIG. 5 illustrates an example serialization 500 according to the example encoding format illustrated above with respect to Tables 3-7. As shown, an example input array of three elements can be encoded as a series of bytes into a binary package.

Figure 6:
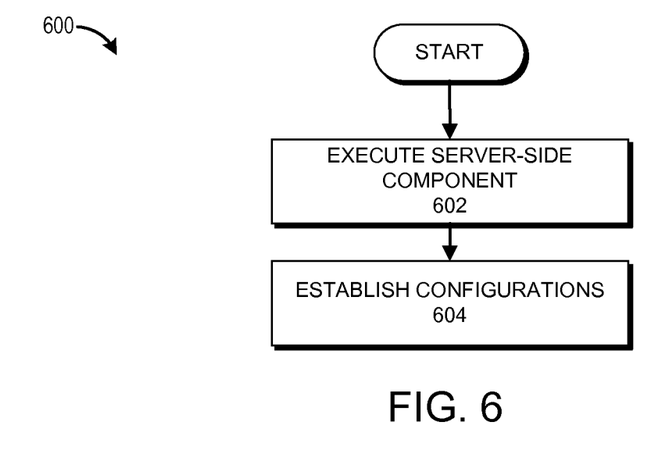
FIG. 6 illustrates an example of a process for configuring a server-side component.

FIG. 6 illustrates an example of a process 600 for configuring a server-side component such as, for example, the server-side component 110*b* of FIG. 1. The process 600 can be implemented by any system that can process data. For example, the process 600, in whole or in part, can be implemented by one or more of the server 116 and the information handling system 200. The process 600 can also be performed generally by the system 100. Although any number of systems, in whole or in part, can implement the process 600, to simplify discussion, the process 600 will be described in relation to the server 116 of FIG. 1.

Figure 7:
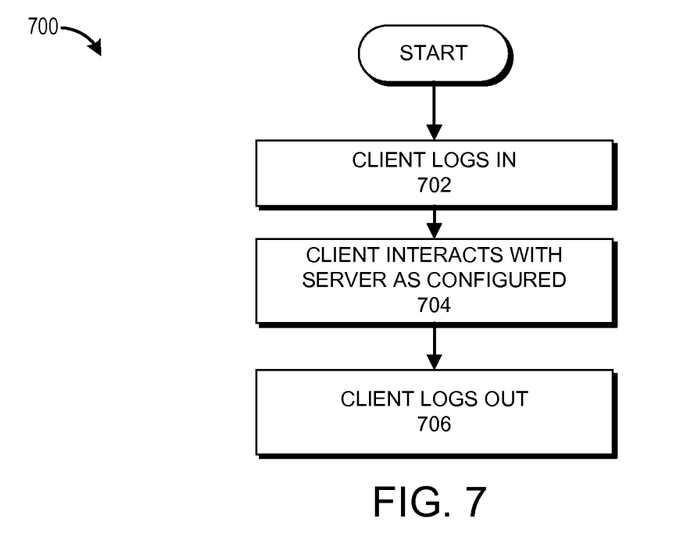
FIG. 7 illustrates an example of a process for executing a client session with a server.

At block 602, the server 116 executes the server-side component 110*b*. In various embodiments, the block 602 can include instantiating one or more server-side classes such as, for example, one or more server-side classes that include methods or functions which form part of the server-side interface 112*b*. At block 604, the server 116 establishes configurations such as, for example, all or part of the configurations 118. In certain embodiments, the block 604 can include registering one or more actions via a call to an action-registration method or function. In various cases, each action can be identified by a unique string. The registration of the action can include passing, as arguments, an action-specific registration method (e.g., a delegate method) which registers an action verb (e.g., the unique string name) and an action-specific execution method (e.g., another delegate method) which will perform the action FIG. 7 illustrates an example of a process 700 for executing a client session with a server. The process 700 can be implemented by any system that can process data. For example, the process 700, in whole or in part, can be implemented by one or more of the client 114, server 116, and the information handling system 200. The process 700 can also be performed generally by the system 100. Although any number of systems, in whole or in part, can implement the process 700, to simplify discussion, the process 700 will be described in relation to specific components of the system 100 of FIG. 1.

At block 702, the client 114 logs in to the server 116. More specifically, the block 702 can entail the client-side component 110*a* calling a login method or function, for example, as shown in Table 1 above. The call to the login method or function can result in calls to methods or functions of the server-side component 110*b* to accomplish the login. The block 702 typically yields a session identifier.

At block 704, the client-side component 110*a* interacts with the server-side component 110*b*, for example, by calling one or more methods or functions shown in Table 1 above, which methods or functions typically result in calls to methods or functions of the server-side component 110*b*. The client-side component can also execute one or more public methods or functions of the server-side component 110*b* such as, for example, the methods or functions listed in Table 2 above.

In particular, the client-side component 110*a* can execute registered actions via a call to an action-execution method as shown in Table 1 above, which call can result in the action being executed by the server-side component 110*b*. An example of action execution will be described in greater detail with respect to FIG. 8. It should be appreciated that the block 704 can include the client-side component 110*a* and the server-side component 110*b* repeatedly exchanging serialized data sets (e.g., binary packages) in the fashion described above with respect to FIGS. 3-5 and Tables 3-7.

At block 706, the client 114 logs out of the server 116. Logging out at the block 706 can involve the client-side component 110*a* calling a logout method or function, for example, as shown in Table 1 above, which call may include the session identifier as an argument. The call to the logout method or function can result in calls to methods or functions of the server-side component 110b to accomplish the logout.

Figure 8:
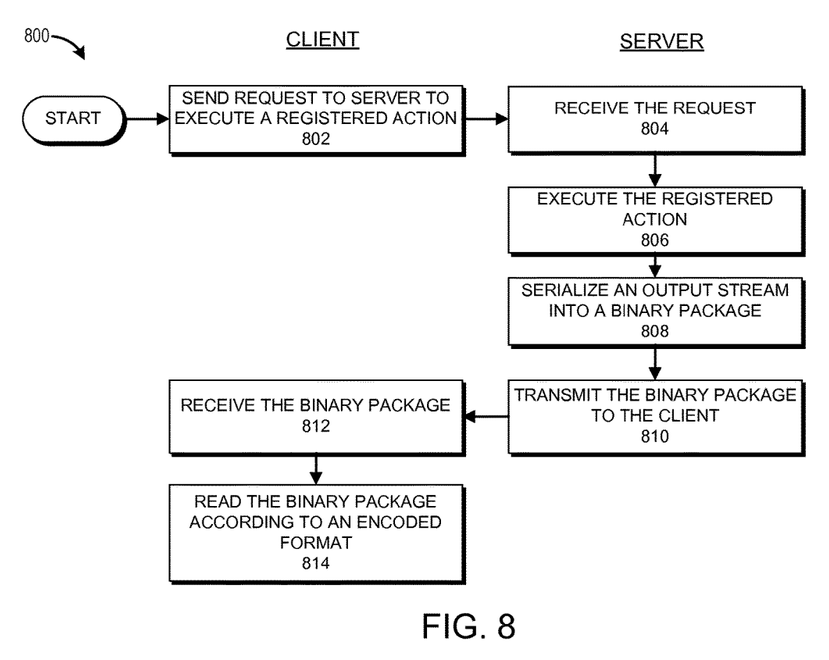
FIG. 8 illustrates an example of a process for serializing a data set in connection with a registered action.

FIG. 8 illustrates an example of a process 800 for serializing a data set in connection with a registered action. The process 800 can be implemented by any system that can process data. For example, the process 800, in whole or in part, can be implemented by one or more of the client 114, server 116, and the information handling system 200. The process 800 can also be performed generally by the system 100. Although any number of systems, in whole or in part, can implement the process 800, to simplify discussion, the process 800 will be described in relation to specific components of the system 100 of FIG. 1.

At block 802, the client 114 sends a request to the server 116 to execute a registered action. The registered action may have become registered as a result of a process similar to the process 600 of FIG. 6 (e.g., block 604). The request may be sent, for example, as a result of the client-side component 110a calling an action-execution method or function as described above. The call can specify a unique string identifying the registered action, a session identifier corresponding to a login session, and/or other information. Advantageously, in certain embodiments, each registered action can be associated with an index value. In these embodiments, the call can specify the index value which may be, for example, on the order of one or two bits. In many cases, this approach can save significant bandwidth as a result of the elimination of a need to transmit the unique string identifying the action. In some of these embodiments, the index values may be provided, for example, via a "ListActions" method or function similar the one shown in Table 2 above.

At block 804, the server 116 and, more specifically, the server-side component 110b, receives the request. At block 806, the server 116, via the server-side component 110b, executes the registered action. In various embodiments, the registered action may yield an output stream comprising a plurality of data elements. At block 808, the server 116, via the server-side component 110b, serializes the output stream into a binary package in the fashion described above with respect to FIGS. 3-5 and Tables 3-7. At block 810, the server 116, via the server-side component 110b, transmits the binary package to the client 114. At block 812, the client 114, via the client-side component 110a, receives the binary package. At block 814, the client 114 reads the binary package according to a known encoded format thereof such as, for example, the encoded format described above with respect to Tables 3-7.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system comprising physical hardware:
    at a source, serializing a data set into a binary package for transmission to a destination;
    wherein the source and the destination are each preconfigured to use an encoding format that specifies, for each data type of a plurality of data types, a preconfigured indicator of a predefined multi-bit element value, the preconfigured indicator requiring fewer bits to represent than the predefined multi-bit element value;
    wherein, for each data type of the plurality of data types, the source and the destination are preconfigured to read the encoding format before any transmission of the predefined multi-bit element value;
    wherein the serializing comprises, for each element of the data set:
        determining whether a data type of the element corresponds to one of the plurality of data types for which the source is preconfigured;
        responsive to a determination that the data type of the element corresponds to at least one data type of the plurality of data types for which the source is preconfigured, determining whether the element includes the predefined multi-bit element value of the at least one data type;
        encoding a lead byte comprising a data-type identifier and a value indicator;
        wherein, responsive to a determination that the element includes the at least one predefined multi-bit element value of the at least one data type, the encoding of the lead byte comprises setting the value indicator to the preconfigured indicator of the predefined multi-bit element value of the at least one data type;
        wherein, responsive to a determination that the element does not include the predefined multi-bit element value of the at least one data type, the encoding of the lead byte comprises setting the value indicator to a preconfigured value-follows indicator;
        encoding an element-value bit stream when the value indicator is set to the preconfigured value-follows indicator; and
    initiating transmission of the binary package to the destination.

2. The method of claim 1, wherein the serializing comprises, for each element of the data set corresponding to a data type of a second plurality of data types:
    encoding a second lead byte and a variable-size element bit stream; and
    wherein the second lead byte comprises a second data-type identifier and an element-size indicator.

3. The method of claim 2, wherein the second plurality of data types comprises at least one of an array data type, a hashmap data type, and a string data type.

4. The method of claim 1, wherein the plurality of data types comprises at least one of a DateTime data type, a globally unique identifier (GUID) data type, and a double data type.

5. The method of claim 1, comprising:
    wherein the source comprises a server and the destination comprises a client;
    wherein the server and the client implement a standard interface, the standard interface comprising a server-side interface and a client-side interface;
    wherein the serializing and the initiating are performed by the computer system via a server-side component of a client-server application;
    prior to the serializing, configuring the server component on the server, the configuring comprising:
        executing a server application, the executing comprising instantiating a server-side class comprising the server-side interface; and
        wherein the server application implements a set of server-side methods defined by the server-side class.

6. The method of claim 5, wherein:
the set of server-side methods comprises an action-registration method; and
the configuring comprises registering one or more actions via a call to the action-registration method.

7. The method of claim 6, wherein the registering comprises passing an action-specific execution method to the action-registration method as an argument.

8. The method of claim 6, wherein the registering comprises passing an action-specific registration method to the action-registration method as an argument.

9. The method of claim 5, comprising:
receiving a request from the client to execute a registered action;
executing the registered action;
wherein the serializing is performed responsive to the executing of the registered action; and
wherein the binary package comprises an output stream relating to the registered action.

10. The method of claim 9, wherein the request specifies an index value corresponding to the registered action.

11. The method of claim 1, wherein:
the source comprises a client;
the destination comprises a server; and
the server and the client implement a standard interface, the standard interface comprising a server-side interface and a client-side interface.

12. An information handling system comprising a computer processor and memory, wherein the computer processor and memory in combination are operable to implement a method comprising:
at a source, serializing a data set into a binary package for transmission to a destination;
wherein the source and the destination are each preconfigured to use an encoding format that specifies, for each data type of a plurality of data types, a preconfigured indicator of a predefined multi-bit element value, the preconfigured indicator requiring fewer bits to represent than the predefined multi-bit element value;
wherein, for each data type of the plurality of data types, the source and the destination are preconfigured to read the encoding format before any transmission of the predefined multi-bit element value;
wherein the serializing comprises, for each element of the data set:
determining whether a data type of the element corresponds to one of the plurality of data types for which the source is preconfigured;
responsive to a determination that the data type of the element corresponds to at least one data type of the plurality of data types for which the source is preconfigured, determining whether the element includes the predefined multi-bit element value of the at least one data type;
encoding a lead byte comprising a data-type identifier and a value indicator;
wherein, responsive to a determination that the element includes the at least one predefined multi-bit element value of the at least one data type, the encoding of the lead byte comprises setting the value indicator to the preconfigured indicator of the predefined multi-bit element value of the at least one data type;
wherein, responsive to a determination that the element does not include the predefined multi-bit element value of the at least one data type, the encoding of the lead byte comprises setting the value indicator to a preconfigured value-follows indicator;
encoding an element-value bit stream when the value indicator is set to the preconfigured value-follows indicator; and
initiating transmission of the binary package to the destination.

13. The information handling system of claim 12, wherein the serializing comprises, for each element of the data set corresponding to a data type of a second plurality of data types:
encoding a second lead byte and a variable-size element bit stream; and
wherein the second lead byte comprises a second data-type identifier and an element-size indicator.

14. The information handling system of claim 13, wherein the second plurality of data types comprises at least one of an array data type, a hashmap data type, and a string data type.

15. The information handling system of claim 12, wherein the plurality of data types comprises at least one of a DateTime data type, a globally unique identifier (GUID) data type, and a double data type.

16. The information handling system of claim 12, the method comprising:
wherein the source comprises a server and the destination comprises a client;
wherein the server and the client implement a standard interface, the standard interface comprising a server-side interface and a client-side interface;
wherein the serializing and the initiating are performed by the information handling system via a server-side component of a client-server application;
prior to the serializing, configuring the server component on the server, the configuring comprising:
executing a server application, the executing comprising instantiating a server-side class comprising the server-side interface; and
wherein the server application implements a set of server-side methods defined by the server-side class.

17. The method of claim 16, wherein:
the set of server-side methods comprises an action-registration method; and
the configuring comprises registering one or more actions via a call to the action-registration method, the registering comprising passing an action-specific registration method and an action-specific execution method to the action-registration method as arguments.

18. The method of claim 16, comprising:
receiving a request from the client to execute a registered action;
executing the registered action;
wherein the serializing is performed responsive to the executing of the registered action; and
wherein the binary package comprises an output stream relating to the registered action.

19. The method of claim 18, wherein the request specifies an index value corresponding to the registered action.

20. A computer-program product comprising a non-transitory computer-usable medium having computer-readable program code embodied therein, the computer-readable program code adapted to be executed to implement a method comprising:
at a source, serializing a data set into a binary package for transmission to a destination;
wherein the source and the destination are each preconfigured to use an encoding format that specifies, for each data type of a plurality of data types, a preconfigured indicator of a predefined multi-bit element value, the preconfigured indicator requiring fewer bits to represent than the predefined multi-bit element value;

wherein, for each data type of the plurality of data types, the source and the destination are preconfigured to read the encoding format before any transmission of the predefined multi-bit element value;

wherein the serializing comprises, for each element of the data set:
  determining whether a data type of the element corresponds to one of the plurality of data types for which the source is preconfigured;
  responsive to a determination that the data type of the element corresponds to at least one data type of the plurality of data types for which the source is preconfigured, determining whether the element includes the predefined multi-bit element value of the at least one data type;
  encoding a lead byte comprising a data-type identifier and a value indicator;
  wherein, responsive to a determination that the element includes the at least one predefined multi-bit element value of the at least one data type, the encoding of the lead byte comprises setting the value indicator to the preconfigured indicator of the predefined multi-bit element value of the at least one data type;
  wherein, responsive to a determination that the element does not include the predefined multi-bit element value of the at least one data type, the encoding of the lead byte comprises setting the value indicator to a preconfigured value-follows indicator;
  encoding an element-value bit stream when the value indicator is set to the preconfigured value-follows indicator; and
initiating transmission of the binary package to the destination.

* * * * *